UNITED STATES PATENT OFFICE.

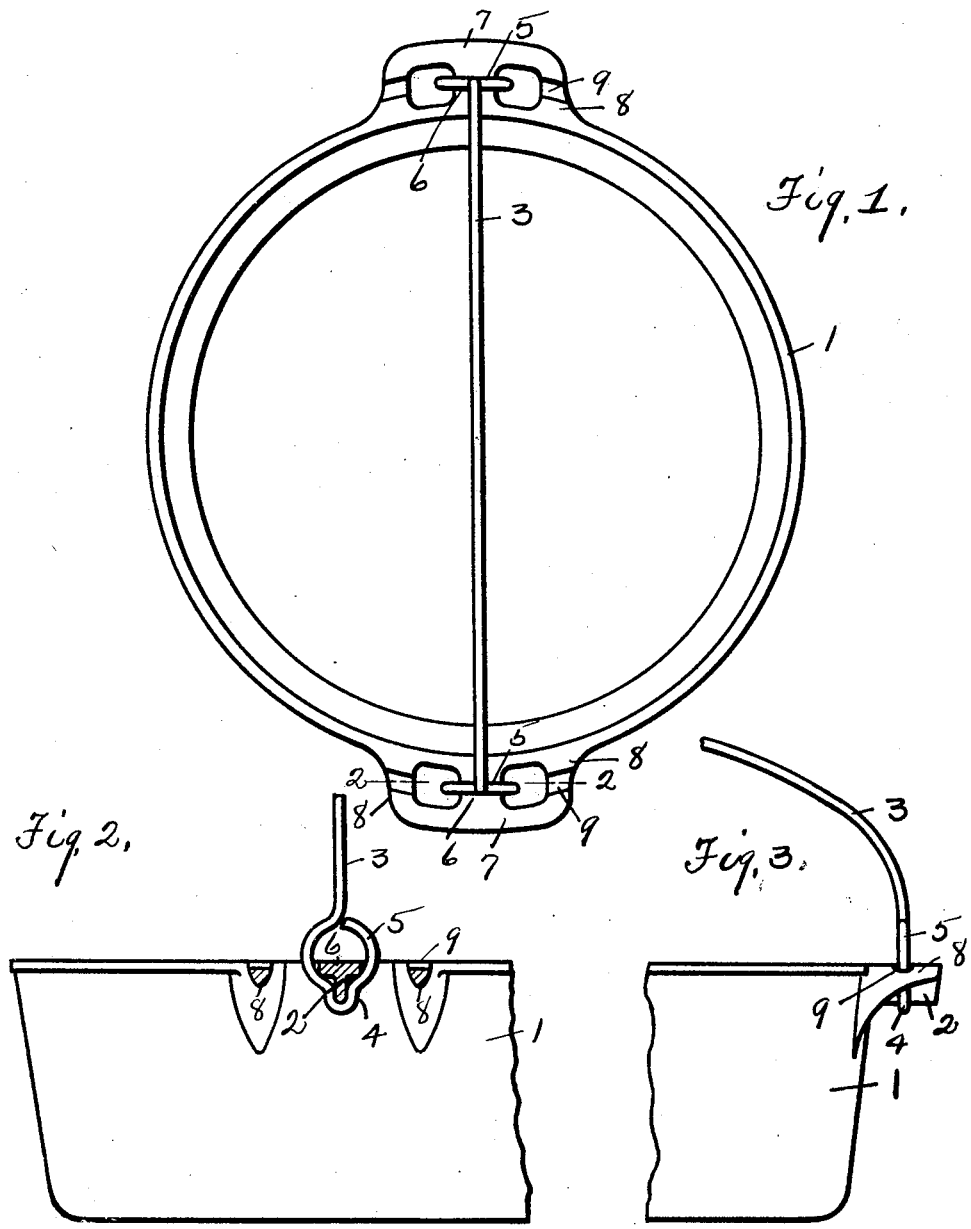

JOHN C. HOLLANDS, OF ERIE, PENNSYLVANIA, ASSIGNOR TO GRISWOLD MANUFACTURING COMPANY, OF ERIE, PENNSYLVANIA, A CORPORATION OF PENNSYLVANIA.

RECEPTACLE.

1,333,917.  Specification of Letters Patent.  Patented Mar. 16, 1920.

Application filed March 10, 1919. Serial No. 281,675.

*To all whom it may concern:*

Be it known that I, JOHN C. HOLLANDS, a citizen of the United States, residing at Erie, in the county of Erie and State of Pennsylvania, have invented new and useful Improvements in Receptacles, of which the following is a specification.

This invention relates to receptacles and consists in certain improvements in the construction thereof as will be hereinafter fully described and pointed out in the claims. The invention is illustrated in connection with a kettle.

With certain types of kettles especially those of comparatively large diameter and shallow depth it is desirable to prevent the tilting of the kettle when it is lifted by the bail. The present invention conveniently accomplishes this purpose.

The invention is illustrated in the accompanying drawings as follows:—

Figure 1 shows a plan view of the kettle.

Fig. 2 a section on the line 2—2 in Fig. 1.

Fig. 3 a side elevation of a fragment of the kettle.

1 marks the kettle, 2 the bail lugs extending from the kettle, and 3 the bail. The bail lug has its bottom part at least preferably of some length vertically and the bail terminates in a loop with a lower portion 4 of a width to engage the sides of the lug so as to lock the lug against turning relatively to the bail. The loop is enlarged above the bottom portion 4 so that when the bail drops as it is released the lug is brought into the enlarged portion 5 and as this is practically circular in form the bail readily drops, or swings to a horizontal position. It will be readily seen that when the kettle is suspended from the bail so that the weight of the kettle is carried through the lug 2 the lug 2 is drawn into the reduced portion 4 of the loop so that the kettle so long as it is thus suspended is locked against turning. I prefer to provide a cross portion 6 on the lug so as to strengthen it.

There is also preferably provided the bail supports 8 which extend outwardly from the side walls of the kettle adjacent to the lug 2 and in position to receive and support the bail when in a horizontal position. The supports are grooved at 9 so as to permit the bail to assume a practically horizontal position. In order to strengthen the lugs and supports I connect them with the loop or bridge piece 7.

It will be noted that the lug 2 extends from the side of the kettle and that there is no obstruction above or below this extension. This is also true of the supports 8 and the connecting bridge 7. This permits the ready casting of the kettle in molding.

What I claim as new is:—

1. A receptacle having a bail-engaging receptacle support projecting from the side thereof with the wall of the receptacle above and below the support unobstructed; and a bail swingingly mounted on the support, said bail and support having means forming a locking engagement when the bail is subjected to the weight of the receptacle.

2. A receptacle having a bail-engaging receptacle support; and a bail having a loop encircling the support, a portion of the loop permitting the turning of the entire support therein and a portion at least making a locking engagement with the support.

3. A receptacle having a bail-engaging receptacle support; and a bail having a loop encircling the support, a portion of the loop permitting the turning of the entire support in either direction and a portion of the loop making a locking engagement with the support.

4. A receptacle having a bail lug; and a bail having a loop encircling the lug, a portion of the loop permitting the turning of the lug therein in either direction and a portion of the loop making a locking engagement with the lug.

5. A receptacle having a bail lug; and a bail having a loop encircling the lug of sufficient diameter to permit the turning of the entire lug within the loop, the lower portion of the loop being reduced in size to make a locking engagement with the lug when the bail is subjected to the weight of the receptacle.

6. A receptacle having a bail-engaging receptacle support projecting from the side thereof with the wall of the receptacle above and below the support unobstructed; a bail swingingly mounted on the support, said bail and support having means forming a locking engagement when the bail is subjected to the weight of the receptacle; and a bail support spaced from the receptacle support.

7. A receptacle having a bail-engaging receptacle support projecting from the side thereof with the wall of the receptacle above and below the support unobstructed; a bail swingingly mounted on the support, said bail and support having means forming a locking engagement when the bail is subjected to the weight of the receptacle; and a bail support connected at its outer end with the receptacle support.

8. A receptacle having a bail-engaging receptacle support projecting from the side thereof with the wall of the receptacle above and below the support unobstructed; a bail swingingly mounted on the support; a bail support projecting from the receptacle and spaced from the receptacle support; and a connection between the outer ends of said supports.

In testimony whereof I have hereunto set my hand.

JOHN C. HOLLANDS.